UNITED STATES PATENT OFFICE.

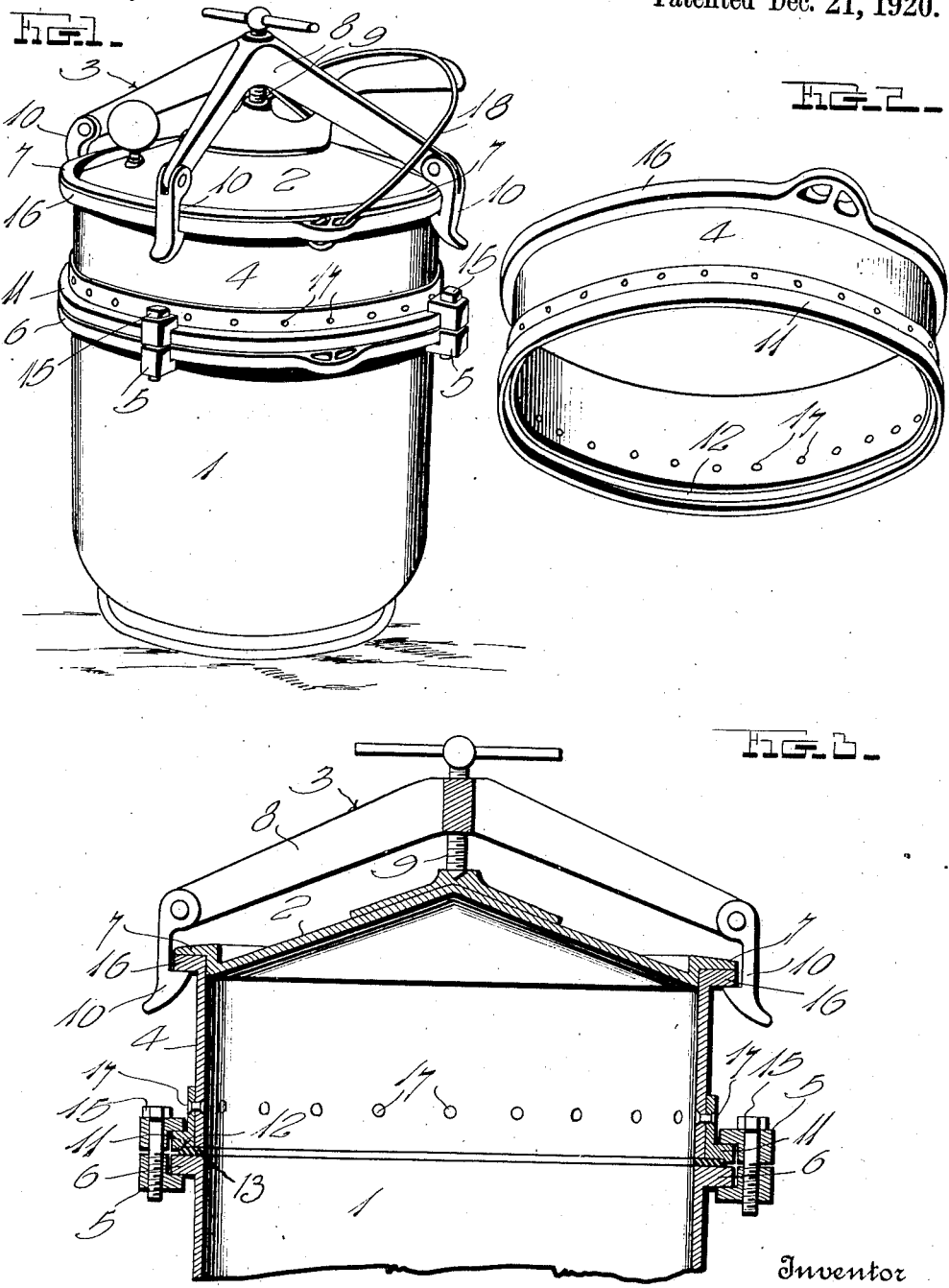

WALTER M. LADD, OF OMAHA, NEBRASKA.

STEAM-PRESSURE COOKER AND CANNER ATTACHMENT.

1,362,878.

Specification of Letters Patent. Patented Dec. 21, 1920.

Application filed October 13, 1919. Serial No. 330,395.

*To all whom it may concern:*

Be it known that I, WALTER M. LADD, a citizen of the United States, residing at Omaha, in the county of Douglas and State of Nebraska, have invented certain new and useful Improvements in Steam-Pressure Cooker and Canner Attachments; and I do declare the following to be a full, clear, and exact description of the invention, such as will enable others skilled in the art to which it appertains to make and use the same.

This invention relates to cooking utensils, and it more specifically relates to an improved attachment for a boiler or cooker of previously known construction.

One object of this invention is to provide an improved attachment or extension whereby the capacity of the cooking utensil may be easily and conveniently increased or decreased at the will of the user at a comparatively slight expense.

A further object of the invention is to provide an attachment or extension of this character which is especially applicable and useful in connection with a previously known boiler or cooker of improved form.

Other objects and advantages may become apparent to persons who read the following details of description in connection with the accompanying drawings in which:

Figure 1, is a perspective view illustrating my improved attachment in place on a cooker in readiness for use.

Fig. 2, is a perspective view of the main member of my improved attachment separated from the cooker.

Fig. 3, is an enlarged sectional detailed view.

Referring to these drawings in detail in which similar reference characters correspond with similar parts throughout the several views and in which the boiler or cooking receptacle 1, its lid 2 and the lid-clamp 3 are of previously known construction, my invention comprises the novel form of attachment or extension 4 and the clamps 5 which secure it to the receptacle 1.

In order that the invention may be thoroughly understood, it is hereby explained that the receptacle 1 is cylindrical and is formed with an annular flange 6 which extends outwardly from its margin or upper end. The lid or cover 2 is formed with an upwardly and outwardly extending flange 7, which fits against the inner and upper surfaces of the flange 6 when the members 1 and 2 are used without connection with the cylindrical extension or attachment 4. The clamp 3 comprises a spider 8 having a screw 9 threaded in its central portion and having latches 10 pivoted to the respective arms of the spider. When the lid 2 is on the flange 6 of the receptacle, it may be secured thereon by placing the spider over its top so that the screw 9 rests in a central socket or depression of the lid 2. By properly turning the screw 9, the spider will be lowered until the latches 10 extend under the flange 6 and then by turning the screw 9 in the opposite direction, the latches will engage with the flange 6 and coöperate therewith to secure the cover or lid in position on the receptacle 1.

The cooker just previously described is adequate for ordinary family use but in case of a family reunion, or other emergencies, such as operations of cooking fruit or vegetables, or canning, preserving, etc., it is desirable to increase the capacity and also, at times, to render the device substantially steam-tight. In case of such emergencies, one of my improved extensions 4 may be secured in position between the members 1 and 2 as indicated in Figs. 1 and 3 of the drawings. In order that the extension 4 may be very quickly, easily and securely held in its useful position, its lower end is provided with a flange 11 which is recessed at 12 to provide a seat for a gasket 13, and a series of clamps 5 are engaged with the flanges 6 and 11, each of these clamps comprising two relatively movable jaws and a bolt 15. For the purpose of convenience and economy in manufacturing the extension 4, its main body portion is preferably pressed, forged or drawn from a single blank of sheet metal flange 16 being thus formed integrally therewith, but it is difficult to form sufficiently strong flanges at both the upper and lower ends of the extension 4 by one of the above named methods and so the flange 11 is preferably formed separately and secured to the main cylindrical body by rivets 17 or other appropriate means. The flange 16 is preferably of the same shape and dimensions of the flange 6 and therefore, the clamping or securing element 3 is interchangeably engaged with the flanges 6 and 16. Moreover, the lid 2 fits snugly upon the flange 16 as it does upon the flange 6 and is approximately steam-tight. Therefore, when the clamps 5 secure the extension 4 in place and the lid-clamp secures the lid in place and boiling takes place in the utensil, steam is compressed in the utensil and thereby raises the temperature to the desired degree, it being understood that the steam pressure may be regulated by the screw 9; that is, by loosening the screw the escape of steam is increased, and by tightening the screw the escape is diminished.

A handle or bail 18 is provided and this may be interchangeably connected to the flanges 6 and 16.

Although I have described this embodiment of my invention very specifically, it is not intended to limit this invention to these exact details of description, but changes may be made within the scope of the inventive idea as claimed.

What I claim is my invention is:

In an extensible cooker, a cooking receptacle having a hollow cylindrical upper end formed with an annular outwardly projecting flange, a lid adapted to rest on said flange, a lid-clamp to engage with said flange for securing said lid on said receptacle, a hollow cylindrical attachment to extend the height of said cooking receptacle, a plurality of attaching clamps, and a gasket, said cylindrical attachment having outwardly extending annular flanges at its upper and lower ends, the lower flange being fitted around a cylindrical surface of said attachment and riveted thereto and being formed with an annular seat, said gasket being fitted in said annular seat to seal the joint between said receptacle and attachment when the latter is attached, each of said attaching clamps comprising two members secured together by means of a screw and engageable respectively with the upper surface of the lower flange of said attachment and the lower surface of the flange of said receptacle, the screws of said attaching clamps being operatable to tighten the clamps, said lid-clamp being engageable with the upper flange of said attachment to secure the lid.

In testimony whereof I have hereunto set my hand.

WALTER M. LADD.